No. 641,817. Patented Jan. 23, 1900.
G. WEISS.
MILLING MACHINE.
(Application filed Feb. 19, 1898.)
(No Model.) 3 Sheets—Sheet 2.

WITNESSES:
INVENTOR
Georg Weiss.
BY
Ludington & Jones
ATTORNEYS

No. 641,817. Patented Jan. 23, 1900.
G. WEISS.
MILLING MACHINE.
(Application filed Feb. 19, 1898.)
(No Model.) 3 Sheets—Sheet 3.
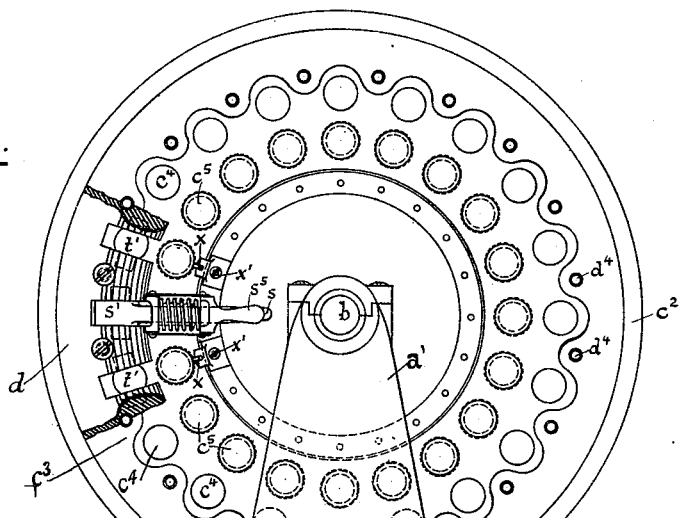
Fig. 3.
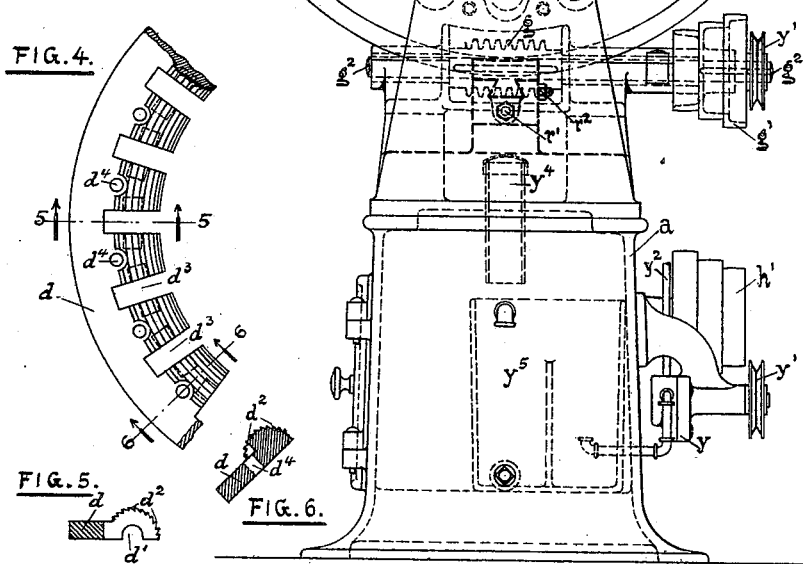
Fig. 4.
Fig. 5.
Fig. 6.
WITNESSES: 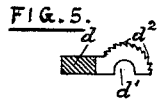
INVENTOR
Georg Weiss.
BY
Ludington & Jones
ATTORNEYS
THE NORRIS PETERS CO., PHOTO-LITHO., WASHINGTON, D. C.

UNITED STATES PATENT OFFICE.

GEORG WEISS, OF CHICAGO, ILLINOIS.

MILLING-MACHINE.

SPECIFICATION forming part of Letters Patent No. 641,817, dated January 23, 1900.

Application filed February 19, 1898. Serial No. 670,930. (No model.)

*To all whom it may concern:*

Be it known that I, GEORG WEISS, a citizen of the United States, residing at Chicago, in the county of Cook and State of Illinois, have invented a certain new and useful Improvement in Milling-Machines, of which the following is a full, clear, concise, and exact description, reference being had to the accompanying drawings, forming a part of this specification.

My invention relates to an improved milling-machine, my object being to provide an economical, complete, efficient, and easily-operated mechanism for rapidly milling and handling the object to be milled.

In the art it is usual to provide a movable form for clamping and holding into a certain predetermined position the object to be milled and then to pass this form under the milling-tool. This method necessitates a large loss of time and power during the time when the milling-tool is not in engagement with the object to be milled. This and many other objections are overcome in the present invention, in which in its preferred form is provided a frame or bed carrying a rotatable portion provided with clamping devices whereby the objects to be milled are successively and quickly clamped into forms near the periphery of the rotatable portion, and being so clamped are brought around into engagement with the milling-tool, which is carried on a rotating and a vertically and longitudinally adjustable shaft. The clamping mechanisms or forms shown in the accompanying drawings are especially designed for holding sickle-guards of a harvesting-machine, and while for the purpose of clear illustration this construction is shown throughout yet it is not my intention to limit my invention to this particular form, as it is but a matter of mechanical skill to vary the adjustment and shape of the forms here illustrated so as to receive and hold similar objects of different shape.

I have illustrated my invention in the accompanying drawings, in which—

Figure 1:
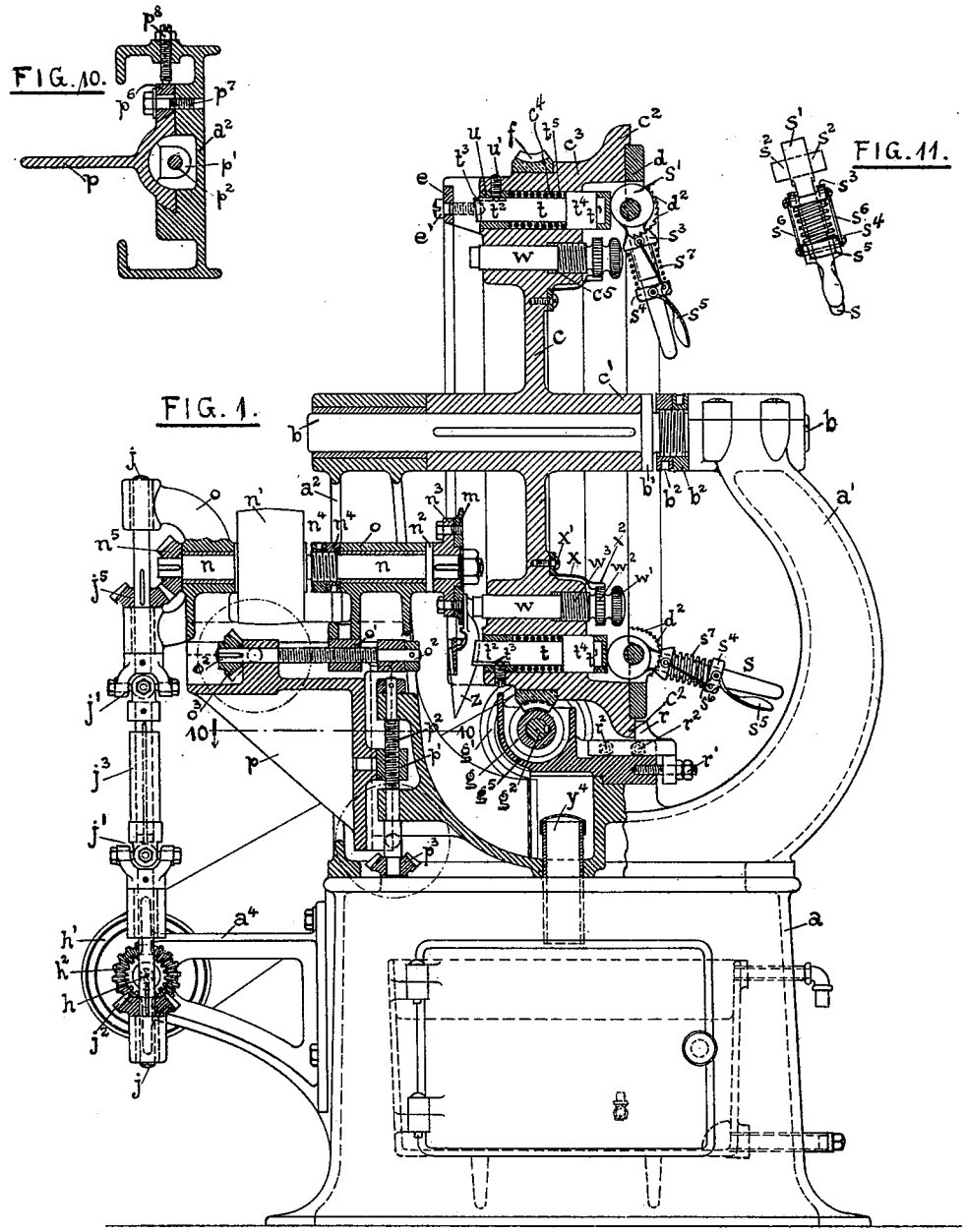
Figure 2:
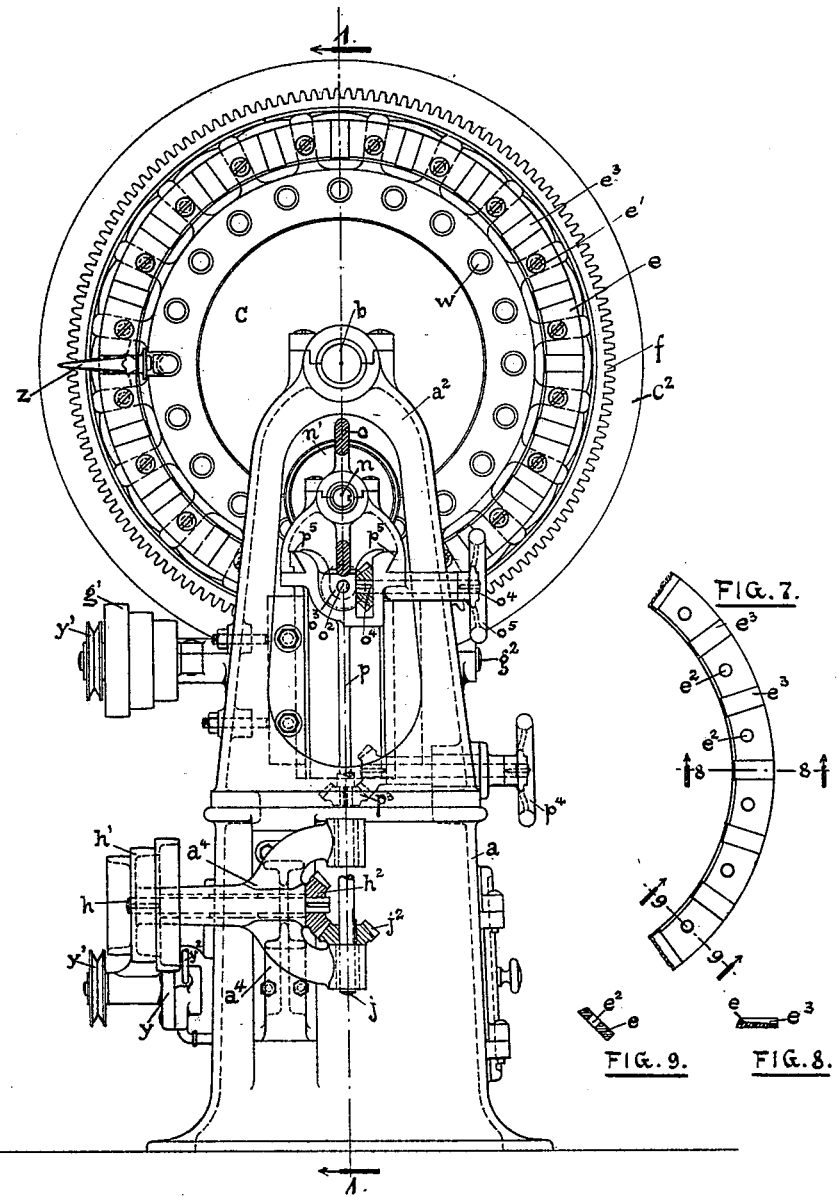

Figure 1 is a side view, with a partial sectional view, on the line 1 1, Fig. 2, showing rotatable clamping device and the adjustable-shaft bearings in partial section. Fig. 2 is an end view with the driving-gear forming the adjustable shaft $j$ omitted for clearness. Fig. 3 is the other end view with a portion of the outer ring on rotatable clamping device omitted for clearness. Fig. 4, Sheet 3, is a view of a portion of the outer ring into which are journaled the clamping-levers. Figs. 5 and 6 are different sectional views of same. Fig. 7, Sheet 2, is a view of a portion of the ring on the opposite side of the rotatable device. Figs. 8 and 9 are different sectional views thereof. Fig. 10, Sheet 1, is a sectional view on line 10 10, Fig. 1, showing in section the arrangement for adjusting vertically the shaft carrying the milling-tool. Fig. 11 is a top view of one of the clamping-handles.

Like letters refer to like parts in the several figures.

The frame or bed $a$ is provided with the upwardly-extending arms $a'$ $a^2$, in the tops of which is journaled the shaft $b$. On the shaft $b$ is the collar $b'$, and between the collar $b'$ and the journal-box on the arm $a'$ are the adjusting and locking nuts $b^3$ $b^2$ for taking up any slack or wear between the hub $c'$ and the shaft-bearings. Keyed to the shaft $b$ is the wheel $c$, carrying the clamping devices or forms and composed of the hub $c'$, the flange $c^2$, the rim $c^3$, and the rings $d$ and $e$. Surrounding the wheel on its periphery is the worm-gearing $f$, which engages below the wheel $c$ the worm-gear $g$, keyed to the shaft $g^2$. Surrounding the worm-gear and shaft is the oil-holding box $g^5$ for keeping the worm-gear well and constantly lubricated. On the end of shaft $g^2$ are the pulleys $g'$, adapted to be in gear with or belted to the pulleys $h'$ on the shaft $h$, shaft $h$ being journaled in the projecting brace or arm $a^4$. On one end of shaft $h$ is the bevel-gear $h^2$ in mesh with a corresponding bevel-gear $j^2$, keyed near the lower end of the vertical shaft $j$. The shaft $j$ carries the universal joints $j'$ $j'$, between which is the keyed sleeve $j^2$, engaging the shaft $j$, whereby the transmission of power from the milling-tool shaft $n$ to the shaft $h$ will not be interfered with by the changing in position or the adjusting of the said shaft $n$.

The milling-tool shaft $n$ is driven by the pulley $n'$ and is journaled in the longitudinally movable and adjustable frame $o$. The said frame $o$ has a projection $o'$, having a threaded hole which is engaged by the screw-shaft $o^2$. The screw-shaft $o^2$ is journaled in the frame-brace $p$ and is keyed to and operated through the bevel-gearing $o^3$ on one end thereof. Bevel-gear $o^3$ is in gear with the shaft $o^4$, to which is keyed the operating-wheel $o^5$. The frame $o$ is supported by and moves longitudinally in the frame-brace $p$ on the runways $p^5$ $p^5$. The frame-brace $p$ is vertically adjustable and carries the projection $p'$, having a threaded hole in engagement with the screw-shaft $p^2$. The screw-shaft $p^2$ is journaled at both ends and carries through the bevel-gear $p^3$, which is in gear with and operated through the operating-wheel $p^4$.

On the inner end of the shaft $n$ is a collar $n^2$, and inside thereof is the head $n^3$, to which is attached the milling-tool $m$. The collar $n^2$ is on the inner side of the bearing in the member $o$, and on the other side of said bearing are the adjustable locking-nuts $n^4$ $n^4$ for taking up any wear and removing all longitudinal movement of the milling-tool shaft $n$. On the outer end of the shaft $n$ is the bevel-gear $n^5$, adapted to engage the corresponding bevel-gear $j^5$, attached near the upper end of the vertical shaft $j$.

The wheel $c$ carries the projecting flange $c^2$, which extends outward and against the adjustable brace $r$, which is adjusted by the screw $r'$ and is fixed into position by the set-screws $r^2 r^2$. In action this arrangement gives a support and brace, so that the pressure of the application of the milling-tool is substantially midway between the brace $r$ and the supporting-shaft $b$, whereby a desirable firmness is secured. Attached to the wheel $c$ is the ring $d$, provided with recesses $d'$ $d'$ on its under side and with ratchet-teeth $d^2$ on its outer side. At intervals in said ring are the openings $d^3$ $d^3$, and through the ring $d$ are the holes $d^4$ $d^4$. The handle $s$ is provided near one end $s'$ with the projections or lugs $s^2$ $s^2$, which are arranged to fit and journal into the recesses $d'$ $d'$ on the ring $d$. The end $s'$ is of circular or cam-like construction eccentric as to the axes of the lugs $s^2$ $s^2$. Surrounding the shank of the handle $s$ is the sleeve $s^3$, carrying on its lower end the collar or pawl having the pawl-teeth adapted to fit the ratchet-teeth $d^2$ $d^2$ on the ring $d$. By having the pawl-teeth in series a much finer adjustment can be secured.

Near the handle $s$ is the collar $s^4$, carrying the lever $s^5$, which latter is pivoted to the collar $s^4$ and is connected by the connecting-rods $s^6$ $s^6$ to the sleeve $s^3$. Between the collar of the sleeve $s^3$ and the collar $s^4$ near the handle $s$ is the coiled spring $s^7$ for holding the pawl and ratchet normally in contact. In the rim $c^3$ of the wheel $c$ are the holes or openings $c^4$ $c^5$. The opening $c^4$ is opposite the end $s'$ of the handle $s$ when the same is fitted in the ring $d$. Within the opening $c^4$ is the plunger $t$, having a head $t'$ adjacent to the circular or cam end $s'$ of the lever $s$. The other end $t^2$ is formed to fit the object to be milled and has on one side thereof the slot or groove $t^3$, into which fits the end of the screw $u'$. Said screw $u'$ has the double function of preventing the plunger $t$ from rotating and of also holding the collar $u$ in position within the hole $c^4$ and around the end $t^2$ of the plunger $t$. At the other end $t'$ of the plunger $t$ is the collar $t^4$. Between the collar $t^4$ and the collar $u$ is the coiled spring $t^5$ for normally keeping the plunger $t$ out of contact and back from the guard $z$ to be milled. Between the hole $c^4$ and the axle $c'$ is the hole $c^5$, and within this hole $c^5$ is the adjustable pin $w$, having a milled head $w'$ on the same side of the wheel as the head $t'$ of the plunger $t$ and having near the end and head $w'$ the slotted collar $w^2$. Within the collar $w^2$ are the threads $w^3$, by which the rod $w$ is longitudinally advanced or retracted. The spring $x$, attached to the wheel $c$ by the screw $x'$, has the flange-like end $x^2$, which engages the slots on the slotted collar $w^2$ of the pin $w$, and thereby prevents the rotation of the said pin $w$ after the same is duly adjusted. The ring $d$ is bolted to the wheel $c$ through the holes $d^4$ $d^4$.

The ring $e$ is bolted to the side of the wheel toward the milling-tool by the bolts $e'$ $e'$, which pass through the ring $e$ in the holes $e^2$ $e^2$. The outer surface of the ring $e$ is provided with slots $e^3$ $e^3$, which are tapering, as shown in Fig. 8. The object of this construction in the ring $e$ is because of the peculiar construction of the object here illustrated as being milled. The upper projection of the sickle-guard $z$ extends over and fits into the groove $e^3$, while the balance of the guard is back of the ring $e$.

In Fig. 10, Sheet 1, is shown in section on line 10 10, Fig. 1, the arrangement of the movement of the vertical frame-brace $p$. The bevel-piece $p^6$ is slotted and bolted to the frame member $a^2$ by the bolt $p^7$. The bolt $p^8$ presses against the side of the piece $p^6$ and permits of the lateral adjustment of the said piece $p^6$, whereby any wear between the frame member $a^2$ and the frame-brace $p$ can be taken up and the operation of the same made firm and certain.

In the operation of the present invention the power is applied to the pulley $n'$, thereby revolving the shaft $n$. This shaft carries and rotates the head $n^3$, which also carries the milling-tool $m$. Shaft $n$ also drives the shaft $j$, which in turn causes the shaft $h'$ to rotate to operate the worm-gear $g$, and thereby to rotate the wheel $c$.

In the operation of a milling-tool so constantly and rapidly used (as here contemplated) it is necessary to have oil or liquids to reduce the friction of the milling. This is provided by the pump $y$, which is operated through the sheaf-pulleys $y'$ $y'$, Figs. 2 and 3, and which forces the liquid through the pipe $y^2$ to the point of milling and permits the same after use to drain back through the strainer $y^4$ into the reservoir $y^5$, from which it is again pumped and so used over and over.

The clamping device, consisting of the plunger $t$ and the handle $s$, is open when in the position shown in Fig. 3. The object to be milled is then inserted between the ring $e$ and the rim $c^3$ of the wheel $c$, and the handle $s$ is then brought toward the horizontal position, thereby forcing, by means of the cam $s'$ operating against the head $t'$ of the plunger $t$, the plunger $t$ toward and against the object to be milled. The pawl and ratchet $s^3 d^2$ prevent the plunger from being pushed back by the spring $t^5$ until the lever $s^5$ is operated to disengage the pawl and ratchet. The object or guard $z$ to be milled being held firmly in position by the locking of the plunger $t$ against it on the inner side, the wheel $c$ gradually revolves, and the object to be milled is thus brought around into engagement with the milling-tool $m$. After the milling the handle $s$ is sprung back, permitting the plunger $t$ to release the guard, and the guard so milled is removed and a new one put in its place. By means of the various adjustments all wear and slack can be readily taken up, so that the operation of the machine will always be firm, thereby preventing chattering. After adjusting and starting the machine the work of the operator consists in simply putting in and removing the guards, which can be done without stoppage.

Having described my invention, what I claim as new, and desire to secure by Letters Patent, is—

1. In a milling-machine the combination with a vertical rotatable portion, of a series of clamps on the side and within the periphery thereof and adapted to hold the object to be milled upon one side of said rotatable portion, means for rotating said rotatable portion and a single adjustable milling-tool shaft adapted to present the milling-tool at the side of the rotatable portion, substantially as described.

2. In combination with a milling-tool and means for operating same, of a vertical rotatable portion in proximity thereto, a series of clamps adapted to hold the object to be milled on the side of the rotatable portion and within the periphery thereof whereby the objects are successively presented to the milling-tool as the said rotatable portion is rotated, substantially as described.

3. The combination with a milling-tool shaft of a vertical laterally-adjustable rotatable portion, of a series of clamps provided within the periphery and on one side of said rotatable portion and handles on the opposite side of said rotatable portion and adapted to operate said clamps, substantially as described.

4. In a milling-machine the combination with a horizontal shaft and bearings therefor, of a rotatable portion on said shaft carrying a series of clamps between said bearings, a milling-tool at one side of said rotatable portion, an adjustable brace at the other side thereof and means for laterally adjusting said rotatable portion whereby any wear between said bearings and said rotatable portion can be taken up, substantially as described.

5. In a milling-machine the combination with an adjustable milling-tool shaft of a rotatable portion, a series of clamps on the side of said rotatable portion and within the periphery thereof and an adjustable brace adapted to prevent lateral deflection of said rotatable portion, substantially as described.

6. In a milling-machine, the combination with a rotatable wheel of two rings attached thereto whereby one of said rings is adapted to form a side of the form or clamp for holding the object to be milled and the other of said rings is adapted to hold and to form a part of the mechanism for operating the clamp and a clamping device for engaging and holding in position the object to be milled, substantially as described.

7. In a milling-machine, the combination with a rotatable wheel having an adjusting-pin and a clamping-plunger therein, of a ring thereon adapted to form one side of the clamping-form opposite the clamping-plunger, substantially as described.

8. In a milling-machine, the combination with a rotatable wheel of two rings attached thereto, a clamping device and a handle journaled in one of said rings for controlling said clamping device, substantially as described.

9. In a milling-machine, the combination with a rotatable portion having a plunger therein, of two rings attached thereto, a handle journaled in one of said rings and having a cam thereon adapted to advance said plunger to clamp the object to be milled and an adjusting-pin carried in said rotatable portion, for adjusting the object to be milled, substantially as described.

10. In a milling-machine the combination with a rotatable portion having forms or clamps thereon, of an adjustable screw for each clamp within and extending through said rotatable part to engage the object to be milled whereby by the advancement or retraction of said adjustable screw the object to be milled may be separately adjusted for the milling-tool, substantially as described.

11. The combination with a milling-machine having an adjustable milling-tool shaft, of a rotatable portion having a plunger or locking-rod therein, two rings attached to said rotating portion, a handle journaled in one of said rings and adapted to advance the said plunger, and an adjusting pin or portion carried in said rotatable portion, substantially as described.

12. In a milling-machine, the combination with a milling-tool shaft $n$ and the movable bearings $o$, of the vertically-adjustable member $p$, the wheel $c$ carrying the adjusting-pin $w$, the plunger $t$, the handle $s$, the adjustable brace $r$, and the locking-nuts $b^2 b^2$ substantially as described.

In witness whereof I have hereunto subscribed my name in the presence of two witnesses.

GEORG WEISS.

Witnesses:
R. S. LUDINGTON,
M. R. ROCHFORD.